United States Patent Office 3,383,388
Patented May 14, 1968

3,383,388
ISOQUINOLONE INTERMEDIATES
William J. Houlihan, Mountain Lakes, and Robert E. Manning, Parsippany, N.J., assignors to Sandoz Inc., Hanover, N.J.
No Drawing. Filed Aug. 17, 1965, Ser. No. 480,479
6 Claims. (Cl. 260—289)

ABSTRACT OF THE DISCLOSURE

The compounds are of the classes of 10b-substituted-1,5,6,10b - tetrahydropyrrolo[2,1-a]isoquinolin - 3(2H)-ones; 11b-substituted-1,2,6,7-tetrahydro-11bH-benzo[a]-quinolozin-4(3H)ones and 12b-substituted-1,2,3,7,8,12b-hexahydro - azepino[2,1-a]isoquinolin-5(4H)-ones. The compounds are useful in the preparation of their corresponding tri-cyclic amines, which are pharmaceutically useful, e.g., as hypotensive-anti-hypertensives.

---

This invention is directed to pharmaceutically active and pharmaceutically acceptable isoquinolines of the formula

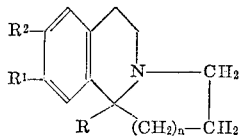

I wherein R is either lower alkyl, e.g. methyl, ethyl, propyl, isopropyl and butyl; monocyclic aryl of the formula

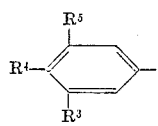

e.g. phenyl and 3,5-dichlorophenyl; α-furyl; β-furyl; α-thienyl; 2-pyridyl; 3-pyridyl or 4-pyridyl;
each of $R^1$ and $R^2$ is, independently, either a hydrogen atom (—H); lower alkoxy (preferably having from 1 to 4 carbon atoms), e.g. methoxy, ethoxy, propoxy, isopropoxy and butoxy; or, taken together, methylenedioxy (—O—$CH_2$—O—);
each of $R^3$, $R^4$ and $R^5$ is, independently, either a hydrogen atom (—H); a chlorine atom (—Cl); a fluorine atom (—F); nitro (—$NO_2$); lower alkyl (preferably having from 1 to 4 carbon atoms), e.g. methyl, ethyl, propyl, isopropyl and butyl; lower alkoxy (preferably having from 1 to 4 carbon atoms), e.g. methoxy, ethoxy, propoxy, isopropoxy and butoxy; or, taken together with its adjacent counterpart, methylenedioxy (—O—$CH_2$—O—)

and
$n$ is either 1, 2 or 3;

and to pharmaceutically acceptable acid addition salts thereof.

Compounds I are prepared according to the following reaction scheme:

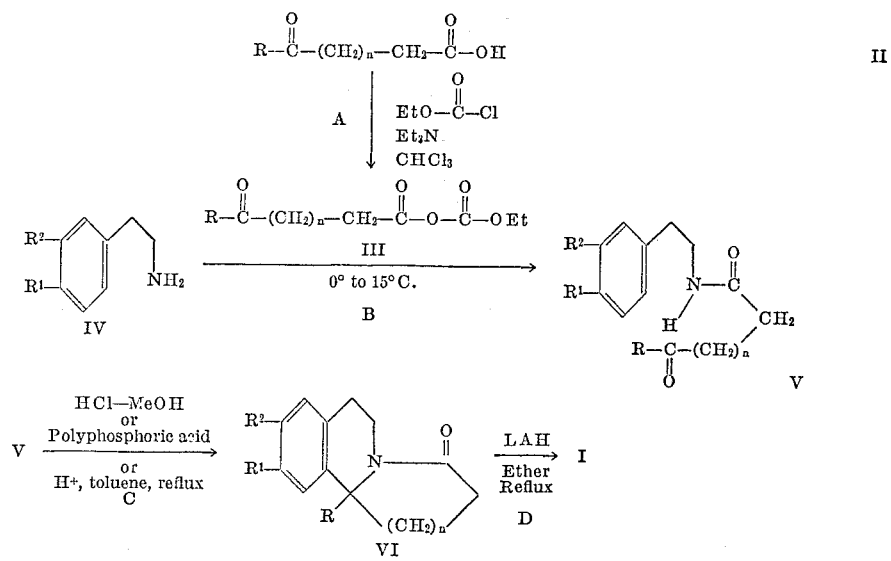

wherein each of R, $R^1$, $R^2$ and $n$ has its above-ascribed meaning, as it does throughout the specification. According to the reaction scheme steps A and B are effected sequentially (without separation) to form a mixed anhydride V by admixing ethyl chloroformate (ethyl chlorocarbonate) with a keto acid II and triethylamine in chloroform at a temperature from 0° to 15° C., followed by the admixture of a β-phenethylamine IV with the resultant (maintained in the same temperature range).

Step C is a cyclization. It is effected with from a 0.5 to a 5.0 percent methanolic solution of hydrogen chloride at a temperature from room temperature (20° C.) to reflux. Alternatively, it is effected either with polyphosphoric acid (PPA) at a temperature from 60° to 120° or with an acid, such as para-toluenesulfonic acid, in toluene under reflux.

Step D is effected by refluxing (with stirring) with lithium aluminum hydride (LAH) in an ether, such as diethylether, dibutylether, tetrahydrofuran and dioxane.

The acid addition salts of compounds I are prepared according to known, well-established procedures from compounds I. Among the pharmaceutically acceptable acid addition salts are salts of organic acids, e.g. tartaric acid; inorganic acids, e.g. hydrochloric acid, hydrobromic acid and sulfuric acid; monobasic acids, e.g. an alkanesulfonic acid, such as methanesulfonic acid ($H_3C$—$SO_3H$); dibasic acids, e.g. succinic acid; tribasic acids, e.g. phosphoric acid and citric acid; saturated acids, e.g. acetic acid; ethylenically unsaturated acids, e.g. maleic acid and fumaric acid; and aromatic acids, e.g. salicyclic acid and arylsulfonic acids, such as benzenesulfonic acid. The only limitation on the acid selected is that the resulting acid addition salt be pharmaceutically acceptable; the acid does not nullify the therapeutic properties of compounds I. It is preferred, however, to select an acid so that the salt therewith is water-soluble; tartaric acid and succinic acid are preferred for this purpose.

Compounds II and IV are either known compounds or are prepared according to standard procedures from available compounds.

Illustrative compounds I (in free base form) are defined by their substituents and the definition of $n$ in the following table. As is appreciated, the starting materials and intermediates are similarly defined. The tabulated compounds I are prepared in the same manner as heretofore described and as exemplified in the ensuing specific examples.

Compounds I and their pharmaceutically acceptable acid addition salts are CNS-active compounds useful as antidepressants, analeptics, CNS stimulants, anti-inflammatories and hypotensive-antihypertensives. They are administered either orally or parenterally in standard dosage forms, e.g. tablets and capsults, in daily doses of from 20 to 200 milligrams.

Each of the pharmaceutically active compounds of this invention may be, e.g., incorporated, for oral administration, in a tablet as the sole active ingredient. A typical tablet is constitued by from 1 to 3 percent binder, e.g. tragacanth; from 3 to 10 percent disintegrating agent, e.g. cornstarch from 2 to 10 percent lubricant e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which as well well-known in the art,

COMPOUNDS I

| R | $R^1$ | $R^2$ | $R^3$ | $R^4$ | $R^4$ | n |
|---|---|---|---|---|---|---|
| —Me | —O—$CH_2$—O— | | | | | 1 |
| —Et | —H | —OMe | | | | 2 |
| —Pr | OMe | —OEt | | | | 3 |
| —iPr | —OEt | —H | | | | 1 |
| —Bu | —OPr | —OMe | | | | 2 |
| —MA | OiPr | —OEt | —H | —Me | —Me | 3 |
| —MA | —OBu | —OMe | —Cl | —OMe | —Et | 1 |
| —MA | —H | —OEt | —F | —F | —Pr | 2 |
| —MA | —OMe | —H | —$NO_2$ | —Cl | —iPr | 3 |
| —MA | —O—$CH_2$—O— | | —OMe | —H | —Bu | 2 |
| —MA | —OEt | —OMe | —OEt | —O—$CH_2$—O— | | 1 |
| —MA | —H | —H | —OPr | —OEt | —H | 3 |
| —MA | —OMe | —H | —OiPr | —Et | —H | 1 |
| —MA | —H | —OMe | —OBu | —$NO_2$ | —H | 2 |
| —MA | —OEt | —OEt | —O—$CH_2$—O— | | —H | 3 |
| —α-Fu | —OMe | —OPr | | | | 1 |
| —β-Fu | —H | —OiPr | | | | 2 |
| —α-T | —H | —OBu | | | | 3 |
| —β-T | —O—$CH_2$—O— | | | | | 1 |
| —2-P | —H | —OMe | | | | 2 |
| —3-P | —OMe | —H | | | | 3 |
| —4-P | —OEt | —H | | | | 1 | wherein, in addition to standard elemental symbols, the following abbreviations are employed:

Me=methyl; Et=ethyl; Pr=propyl; iPr=isopropyl; Bu=butyl; Fu=furyl; T=thienyl; MA 3-$R^3$-4-$R^4$-5-$R^5$-phenyl (monocyclic aryl); P=pyridyl— employing the necessary amounts of conventional granulating liquids, e.g. alcohol SD-30 and purified water. An exemplary tabletting formulation for the instant active compounds is:

| | Parts |
|---|---|
| Title compound of Example 11 | 55 |
| Tragacanth | 2 |
| Lactose | 34.5 |
| Cornstarch | 5 |
| Talcum | 3 |
| Magnesium stearate | 0.5 |
| Alcohol SD-30, q.s. | |
| Purified water, q.s. | |

The following examples are further illustrative of the invention. All temperatures are in degrees centigrade. Parts and percentages are by weight unless otherwise specified, the relationship between parts by weight and parts by volume being the same as that between the kilogram and the liter.

Example 1.—N-[2-(p-methoxyphenyl)ethyl]-3-benzoylpropionamide

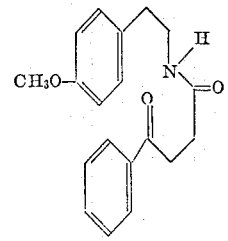

Add dropwise (over a period of one hour) to a stirred solution of 17.8 parts (0.10 mole) of 3-benzoylpropionic acid and 10.1 parts (0.10 mole) of triethylamine in 175 parts by volume of chloroform, within the temperature range of 0° to 5°, a solution of 10.8 parts (0.10 mole) of ethylchloroformate in 25 parts by volume of chloroform. Stir the resultant for an additional three hours. To the thus-stirred solution, add dropwise (over a period of fifteen minutes) a chloroform solution of 15.1 parts (0.10 mole) of β-(4-methoxyphenyl)-ethylamine. Stir the thus-obtained reaction mixture over night (17 hours); extract same with dilute hydrochloric acid; wash with dilute sodium carbonate solution; dry over sodium sulfate and evaporate in vacuo. Crystallize the residue from benzene-pentane to obtain 14 parts of title compound, melting point (m.p.) 96° to 97°.

Replacing the 3-benzoylpropionic acid with an equivalent of either 3-(p-chlorobenzoyl)propionic acid or 3-(3,5-dimethylbenzoyl)-propionic acid results in the praparation, in similar manner, of the corresponding compound V.

Example 2.—N-[2-(3,4-dimethoxyphenyl)ethyl]-4-oxo-valeramide

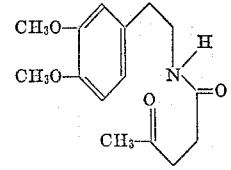

Add dropwise (over a period of one hour) to a stirred solution of 34.8 parts (0.30 mole) of levulinic acid and 30.6 parts (0.30 mole) of triethylamine in 175 parts by volume of chloroform, within the temperature range of 0° to 5°, a solution of 32.4 parts (0.30 mole) of ethylchloroformate in 25 parts by volume of chloroform. Stir the resultant for an additional three hours. To the thus-stirred solution, add dropwise (over a period of fifteen minutes) a chloroform solution of 54.3 parts (0.30 mole) of β-(3,4-dimethoxyphenyl)-ethylamine. Stir the thus-obtained reaction mixture over night; extract same with dilute hydrochloric acid; wash with dilute sodium carbonate solution; dry over sodium sulfate and evaporate in vacuo. Crystallize the residue from benzene-pentane to obtain 17 parts of title compound, m.p. 88° to 90°.

Replacing the levulinic acid with an equivalent of either 5-oxohexanoic acid or 6-oxoheptanoic acid results in the preparation, in similar manner, of the corresponding compound V.

Example 3.—N-[2-(3,4-dimethoxyphenyl)ethyl]-4-benzoylbutyramide

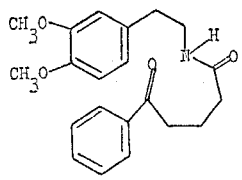

Add dropwise (over a period of one hour) to a stirred solution of 38.4 parts (0.20 mole) of γ-benzoylbutyric acid and 20.2 parts (0.20 mole) of triethylamine in 175 parts by volume of chloroform, within the temperature range of 0° to 5°, a solution of 21.6 parts (0.20 mole) of ethylchloroformate in 25 parts by volume of chloroform. Stir the resultant for an additional three hours. To the thus-stirred solution, add dropwise (over a period of fifteen minutes) a chloroform solution of 36.2 parts (0.20 mole) of β-(3,4-dimethoxyphenyl)-ethylamine. Stir the thus-obtained reaction mixture over night; extract same with dilute hydrochloric acid; wash with dilute sodium carbonate solution; dry over sodium sulfate and evaporate in vacuo. Crystallize the residue from benzene-pentane to obtain 40 parts of title compound, m.p. 98°.

Replacing the γ-benzoylbutyric acid with an equivalent of either γ-(3,4-methylenedioxybenzoyl)butyric acid or β-(3-ethoxybenzoyl)butyric acid results in the preparation, in similar manner, of the corresponding compound V.

Example 4.—N-[2-(3,4-dimethoxyphenyl)ethyl]-5-benzoylvaleramide

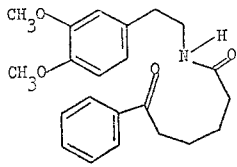

Add dropwise (over a period of one hour) to a stirred solution of 10.3 parts (0.05 mole) of 5-benzoylvaleric acid and 5.1 parts (0.05 mole) of triethylamine in 175 parts by volume of chloroform, within the temperature range of 0° to 5°, a solution of 5.4 parts (0.05 mole) of ethylchloroformate in 25 parts by volume of chloroform. Stir the resultant for an additional three hours. To the thus-stirred solution, add dropwise (over a period of fifteen minutes) a chloroform solution of 9.05 parts (0.05 mole) of β-(3,4-dimethoxyphenyl)-ethylamine. Stir the thus-obtained reaction mixture over night; extract same with dilute hydrochloric acid; wash with dilute sodium carbonate solution; dry over sodium sulfate and evaporate in vacuo. Crystallize the residue from benzene-pentane to obtain 7 parts of title compound, m.p. 84° to 85°.

Replacing the 5-benzoylvaleric acid with an equivalent of either 5-(3-fluorobenzoyl)valeric acid or 5-(4-nitrobenzoyl)valeric acid results in the preparation, in similar manner, of the corresponding compound V.

Example 5.—N-(2-phenylethyl)-3-benzoylpropionamide

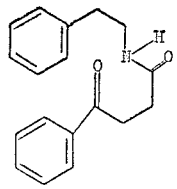

Add dropwise (over a period of one hour) to a stirred solution of 44.5 parts (0.25 mole) of 3-benzoylpropionic acid and 25.2 parts (0.25 mole) of triethylamine in 350 parts by volume of chloroform, within the temperature range of 0° to 5°, a solution of 28 parts (0.25 mole) of ethylchloroformate in 50 parts by volume of chloroform. Stir the resultant for an additional three hours. To the thus-stirred solution, add dropwise (over a period of fifteen minutes) a chloroform solution of 30.2 parts (0.25 mole) of 2-phenylethylamine. Stir the thus-obtained reaction mixture over night; extract same with dilute hydrochloric acid; wash with dilute sodium carbonate solution; dry over sodium sulfate and evaporate in vacuo. Crystallize the residue from benzene-pentane to obtain 25 parts of title compound, m.p. 98°.

Replacing the 3-benzoylpropionic acid with an equivalent of either 3-(3,5-dichlorobenzoyl)propionic acid or 3-(4-ethylbenzoyl)propionic acid results in the preparation, in similar manner, of the corresponding compound V.

Example 6.—10b-phenyl-1,5,6,10b-tetrahydropyrrolo[2,1-a]isoquinolin-3(2H)-one

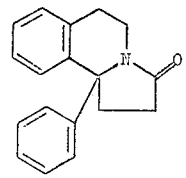

Heat a solution of 60 parts of N-(2-phenylethyl)-3-benzoylpropionamide in 600 parts of polyphosphoric acid at 100° for 16 hours. Admix the thus-obtained dark brown reaction mixture with water and chloroform; wash the organic phase with sodium carbonate solution; dry same over sodium sulfate and evaporate under reduced pressure. Filter a solution of the thus-obtained residue in a benzene-chloroform mixture through a bed of alumina and evaporate the eluant in vacuo. Crystallize the resultant oil from benzene-pentane to obtain 21 parts of pure title compound, M.P. 88°.

Replacing the N-(2-phenethyl)-3-benzoylpropionamide with an equivalent of either N-[2-(p-methoxyphenyl)ethyl]-3-benzoylpropionamide or N-[2-(3,4-dimethoxyphenyl)ethyl]-4-oxovaleramide results in the preparation, in similar manner, of the corresponding compound VI.

Example 7.—N-(2-phenylethyl)-4-benzoylbutyramide

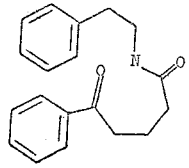

Add dropwise (over a period of one hour) to a stirred solution of 57.6 parts (0.30 mole) of γ-benzoylbutyric acid and 30.1 parts (0.30 mole) of triethylamine in 500 parts by volume of chloroform, within the temperature range of 0° to 5°, a solution of 32.7 parts (0.30 mole) of ethylchloroformate in 80 parts by volume of chloroform. Stir the resultant for an additional three hours. To the thus-stirred solution, add dropwise (over a period of fifteen minutes) a chloroform solution of 36.3 parts (0.30 mole) of 2-phenylethylamine. Stir the thus-obtained reaction mixture over night; extract same with dilute hydrochloric acid; wash with dilute sodium carbonate solution; dry over sodium sulfate and evaporate in vacuo. Crystallize the residue from benzene-pentane to obtain 42 parts of title compound, M.P. 95° to 96°.

Replacing the γ-benzoylbutyric acid with an equivalent of either γ-(3,5-dimethoxybenzoyl)butyric acid or γ-(3-nitrobenzoyl)butyric acid results in the preparation, in similar manner, of the corresponding compound V.

Example 8.—11b-phenyl-1,2,6,7-tetrahydro-11bH-benzo[a]quinolizin-4(3H)-one

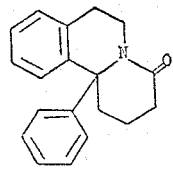

Heat a solution of 5 parts of N-(2-phenylethyl)-4-benzoylbutyramide in 50 parts of polyphosphoric acid at 100° for 16 hours. Admix the thus-obtained dark brown reaction mixture with water and chloroform; wash the organic phase with sodium carbonate solution; dry same over sodium sulfate and evaporate under reduced pressure. Filter a solution of the thus-obtained residue in a benzene-chloroform mixture through a bed of alumina and evaporate the eluant in vacuo. Crystallize the resultant oil from benzene-pentane to obtain 1.3 parts of pure title compound, M.P. 126° to 128°.

Replacing the N-(2-phenethyl)-4-benzoylbutyramide with an equivalent of either N-[2-(3,4-dimethoxyphenyl)ethyl] - 4 - benzoylbutyramide or N-[2-(3,4-dimethoxyphenyl)ethyl]-5-benzoylvaleramide results in the preparation, in similar manner, of the corresponding compound VI.

Example 9.—N-[2-(3,4-dimethoxyphenyl)ethyl]-3-benzoylpropionamide

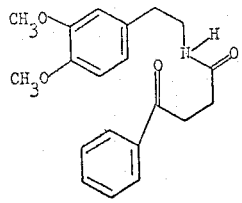

Add dropwise (over a period of one hour) to a stirred solution of 17.8 parts (0.10 mole) of 3-benzoylpropionic acid and 10.1 parts (0.10 mole) of triethylamine in 175 parts by volume of chloroform, within the temperature range of 0° to 5°, a solution of 10.8 parts (0.10 mole) of ethylchloroformate in 25 parts by volume of chloroform. Stir the resultant for an additional three hours. To the thus-stirred solution, add dropwise (over a period of fifteen minutes) a chloroform solution of 18.1 parts (0.10 mole) of β-(3,4-dimethoxyphenyl)ethylamine. Stir the thus-obtained reaction mixture over night; extract same with dilute hydrochloric acid; wash with dilute sodium carbonate solution; dry over sodium sulfate and evaporate in vacuo. Crystallize the residue from benzene-pentane to obtain 12 parts of title compound, M.P. 94° to 95°.

Replacing the 3-benzoylpropionic acid with an equivalent of 3-(3-propylbenzoyl)pripionic acid results in the preparation, in similar manner, of the corresponding compound V.

Example 10.—8,9-dimethoxy-10b-phenyl-1,5,6,10b-tetrahydropyrrolo[2,1-a]isoquinolin-3(2H)-one

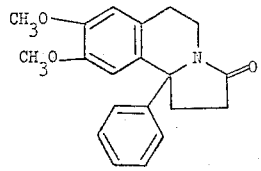

Heat under reflux for 12 hours a solution of 28 parts of N-[2-(3,4-dimethoxyphenyl)ethyl]-3-benzoylpropionamide in 600 parts by volume of methanol containing 15 parts by volume of concentrated hydrochloric acid. Make the reaction mixture basic with the addition thereto of sodium bicarbonate solution and extract with ether. Dry the ether phase over sodium sulfate and evaporate in vacuo. Recrystallize the crystalline residue from methanol to obtain 20 parts of title compound, M.P. 146° to 147°.

The process illustrated by this example and Example 13 appears to be specific to the preparation of 8,9-dimethoxy - 10b - aryl-1,5,6,10b-tetrahydropyrrolo[11-a]isoquinolin-3(2H)-ones.

Example 11.—8,9-dimethoxy-10b-phenyl-1,2,3,5,6,10b-hexahydropyrrolo[2,1-a]isoquinoline

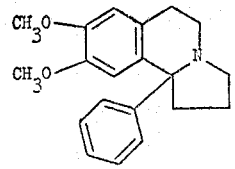

Add dropwise to a soluution of 4.5 parts of lithium aluminum hydride (LAH) in diethylether heated under reflux a solution of 12 parts of 8,9-dimethoxy-10b-phenyl-1,5,6,10b-tetrahydropyrrolo[2,1-a]isoquinolin-3-one in tetrahydrofuran (THF). After heating the resultant for several hours, add (successively) ethylacetate and water; filter the reaction mixture. Evaporate the filtrate in vacuo and crystallize the residue from benzene-pentane to obtain 7 parts of pure title compound, M.P. 95° to 96°.

Replacing the 8,9-dimethoxy-10b-phenyl-1,5,6,10b-tetrahydropyrrolo[2,1-a]isoquinolin-3-one with an equivalent of 10b-phenyl-1,5,6,10b-tetrahydropyrrolo[2,1-a]isoquinolin-3(2H)-one results in the preparation, in similar manner, of the corresponding compound I.

Example 12.—N[2-(3,4-dimethoxyphenyl)ethyl]-3-(α-theonyl)propionamide

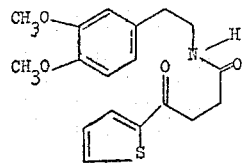

Add dropwise (over a period of one hour) to a stirred solution of 36 parts (0.20 mole) of 3-(α-theonyl)propionic acid and 20.2 parts (0.20 mole) of triethylamine in 175 parts by volume of chloroform, within the temperature range of 0° to 5°, a solution of 21.6 parts (0.20 mole) of ethylchloroformate in 25 parts by volume of chloroform. Stir the resultant for an additional three hours. To the thus-stirred solution, add dropwise (over a period of fifteen minutes) a chloroform solution of 36.2 parts (0.20 mole) of β-(3,4-dimethoxyphenyl)-ethylamine. Stir the thus-obtained reaction mixture over night; extract same with dilute hydrochloric acid; wash with dilute sodium carbonate solution; dry over sodium sulfate and evaporate in vacuo. Crystallize the residue from benzene-pentene to obtain 20 parts of title compound, m.p. 121° after melting and resolidifying at 101°.

Replacing the 3-(α-theonyl)proprionate acid with an equivalent of either 3-(β-theonyl)propionic acid, 3-(α-furoyl)propionic acid, 3-(β-furoyl)propionic acid, 3-(2-pyridinecarbonyl)propionic acid, 3-(3-pyridinecarbonyl)-propionic acid or 3-(4-pyridinecarbonyl)propionic acid results in the preparation, in similar manner, of the corresponding compound V.

Example 13.—8,9-dimethoxy-10b-(2-thienyl)-1,5,6,10b-tetrahydropyrrolo[2,1-a]-isoquinolin-3(2H)-one

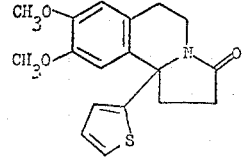

Heat under reflux for 12 hours a solution of 30 parts of N-[2-(3,4-dimethoxyphenyl)ethyl]-3-(α-theonyl)propionamide in 600 parts by volume of methanol containing 15 parts by volume of concentrated hydrochloric acid. Make the reaction mixture basic with the addition thereto of sodium bicarbonate solution and extract same with diethylether. Dry the ether phase over sodium sulfate and evaporate in vacuo. Recrystallize the crystalline residue from methanol to obtain 21 parts of title compound, m.p. 126° to 127°.

Example 14.—8,9-dimethoxy-10b-(2-thienyl)-1,2,3,5,6, 10b-hexahydropyrrolo[2,1-a]-isoquinoline

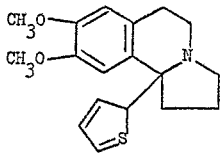

Add dropwise to a solution of 4.5 parts of LAH in diethylether heated under reflux a solution of 20 parts of 8,9-dimethoxy-10b-(2-thienyl-1,5,6,10b-tetrahydropyrrolo-[2,1-a]-isoquinolin-3-one in THF. After heating the resultant for several hours, add (successively) ethylacetate and water; filter the reaction mixture. Evaporate the filtrate in vacuo and crystallize the residue from benzene-pentane to obtain 10 parts of pure title compound, m.p. 77° to 79°.

Replacing the 8,9-dimethoxy-10b-(2-thienyl)-1,5,6,10b-tetrahydropyrrolo[2,1-a]-isoquinolin-3(2H)-one with an equivalent of 11b-phenyl-1,2,6,7-tetrahydro-11bH-benzo [a]quinolizin-4(3H)-one results in the preparaton, in similar manner, of the corresponding compound I.

The invention and its advantages are understood from the foregoing description. Various changes may be made in the intermediates and the final products (including the pharmaceutically acceptable acid addition salts of compounds I) without departing from the spirit and the scope of the invention or sacrificing its material advantages. The starting materials, intermediates and final products set forth hereinbefore are merely illustrative embodiments.

What is claimed is:
1. A compound of the formula

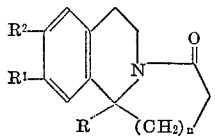

wherein R is linear alkyl having from 1 to 4 carbon atoms;
each of $R^1$ and $R^2$ is a member selected from the group consisting of a hydrogen atom, linear alkoxy having from 1 to 4 carbon atoms, and, taken together, methylenedioxy; and
$n$ is either 1, 2 or 3.

2. A compound of the formula

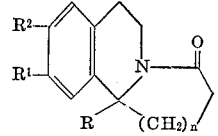

wherein R is a member selected from the group consisting of monocyclic aryl of the formula

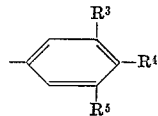

α-furyl, β-furyl, α-thienyl, β-thienyl, 2-pyridyl, 3-pyridyl and 4-pyridyl;
each of $R^1$ and $R^2$ is a member selected from the group consisting of a hydrogen atom, linear alkoxy having from 1 to 4 carbon atoms and, taken together, methylenedioxy;
each of $R^3$, $R^4$ and $R^5$ is a member selected from the group consisting of a hydrogen atom, a chlorine atom, a fluorine atom, linear alkyl having from 1 to 4 carbon atoms, linear alkoxy having from 1 to 4 carbon atoms and, together with an adjacent member, methylenedioxy; and
$n$ is either 1, 2 or 3.

3. 10b-phenyl-1,5,6,10b-tetrahydropyrrolo[2,1 - a]isoquinolin-3(2H)-one.

4. 11b-phenyl-1,2,6,7 - tetrahydro - 11bH - benzo[a]-quinolizin-4(3H)-one.

5. 8,9-dimethoxy-10b - phenyl - 1,5,6,10b - tetrahydropyrrolo[11-a]isoquinolin-3(2H)-one.

6. 8,9-dimethoxy-10b-(2-thienyl)-1,5,6,10b-tetrahydropyrrolo[2,1-a]isoquinolin-3(2H)-one.

References Cited
UNITED STATES PATENTS

| | | | |
|---|---|---|---|
| 2,341,427 | 2/1944 | Dickey et al. | 260—289 XR |
| 3,042,671 | 7/1962 | Lombardino et al. | 260—289 XR |
| 3,121,720 | 2/1964 | Barton et al. | 260—289 XR |

NICHOLAS S. RIZZO, *Primary Examiner.*
DONALD D. DAUS, *Examiner.*